(12) United States Patent
Schikora

(10) Patent No.: US 7,419,211 B2
(45) Date of Patent: Sep. 2, 2008

(54) VEHICLE SEAT, ESPECIALLY AN AIRCRAFT PASSENGER SEAT

(75) Inventor: Stefan Schikora, Wangen (DE)

(73) Assignee: Recaro Aircraft Seating GmbH & Co. KG, Schwäbisch Hall (DE)

(*) Notice: Subject to any disclaimer, the term of this patent is extended or adjusted under 35 U.S.C. 154(b) by 498 days.

(21) Appl. No.: 11/091,715

(22) Filed: Mar. 29, 2005

(65) Prior Publication Data
US 2005/0218706 A1    Oct. 6, 2005

(30) Foreign Application Priority Data
Mar. 30, 2004    (DE)    ........................ 10 2004 016 641

(51) Int. Cl.
*A47C 31/00* (2006.01)
(52) U.S. Cl. .............................. 297/217.3; 297/188.05; 297/188.14; 297/188.16; 248/919; 348/837
(58) Field of Classification Search ............. 297/217.3, 297/188.05, 188.14, 188.15, 188.16, 188.17; 248/919, 920, 917; 348/837, 827
See application file for complete search history.

(56) References Cited

U.S. PATENT DOCUMENTS

| | | | | |
|---|---|---|---|---|
| 5,076,524 A | * | 12/1991 | Reh et al. | 248/296.1 |
| 5,177,616 A | * | 1/1993 | Riday | 348/837 |
| 5,179,447 A | * | 1/1993 | Lain | 348/837 |
| 5,311,302 A | * | 5/1994 | Berry et al. | 348/14.03 |
| 6,007,036 A | * | 12/1999 | Rosen | 248/286.1 |
| 6,179,263 B1 | * | 1/2001 | Rosen et al. | 248/278.1 |
| 6,758,521 B2 | | 7/2004 | Imamura et al. | |
| 2002/0066392 A1 | * | 6/2002 | Calam et al. | 108/33 |

FOREIGN PATENT DOCUMENTS

| | | |
|---|---|---|
| DE | 101 32 282 A 1 | 1/2003 |
| EP | 0 545 691 A1 | 9/1993 |

* cited by examiner

*Primary Examiner*—Laurie K Cranmer
(74) *Attorney, Agent, or Firm*—Posz Law Group, PLC

(57) ABSTRACT

A vehicle seat, especially an aircraft passenger seat, has seat components such as the seat part, backrest and at least one console (10) which laterally borders the seat part, which forms an armrest, and which has a holder (12). In the holder (12), at least one display screen (14, 16) can be lowered in to its rest position. The screen can be moved by an adjustment part (18) out of the rest position into the position of use and vice versa. In the position of use for a seat occupant, data displayed on the display screen can be viewed. The functional possibilities are expanded to the extent that the console holder is used to store the display screen, by which a seat occupant can access information, whether in the form of a television program or movie, or in the form of computer displays.

9 Claims, 1 Drawing Sheet

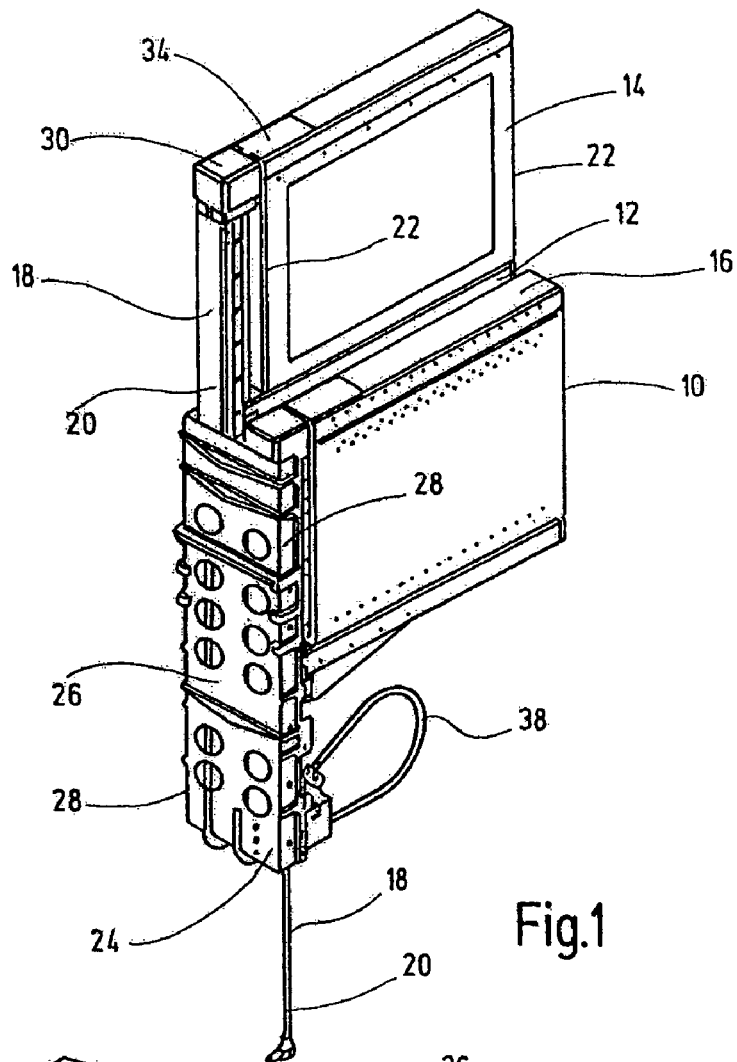
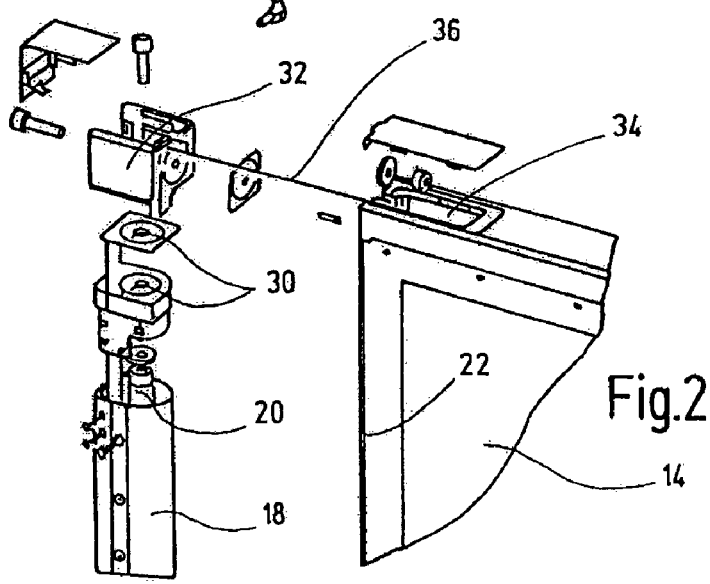
Fig.1
Fig.2

VEHICLE SEAT, ESPECIALLY AN AIRCRAFT PASSENGER SEAT

FIELD OF INVENTION

The present invention relates to a vehicle seat, especially an aircraft passenger seat, with seat components such as the seat part, backrest and at least one console which laterally borders the seat part, which forms an armrest, and which has a holder.

BACKGROUND OF THE INVENTION

DE 101 32 282 A1 discloses a generic vehicle seat in the form of an aircraft passenger seat, with a console which forms an armrest and with a holder for a plate. The plate holder is articulated to the console by an adjustment mechanism and can be adjusted by that mechanism out of a rest position retracted in the console selectively, into a separating element position in which it is moved upward out of the console and extends the lateral boundary of the seat part upward, and out of the separating element position into a horizontal position forming a table surface. In passenger aircraft with rows of seats in which there are several seats next to one another, efforts have been underway to make available as much privacy as possible to passengers who are sitting next to one another. The known possibility of moving a separating element out of the console between two seats located next to one another contributes significantly to achieving this object. The plate which has been moved upward out of the console forms a type of shielding of the seat area relative to the seat area of the passenger seat located next to it. The known solution does make it possible to use the plate not only as a separating element, but after transfer into the horizontal position, also as a table surface. In spite of this double use, however, other, different possible uses for the holder of the console have not been considered.

SUMMARY OF THE INVENTION

An object of the present invention is to provide a vehicle seat with a console holder allowing other potential uses for a console holder located laterally next to the seat part.

This object is attained by a vehicle seat where at least one display screen can be lowered in a rest position in the holder of the console and can be moved by an adjustment part out of the rest position into the position of use and vice versa. In the position of use for a seat occupant, data displayed on the display screen can be viewed. The operating possibilities are then expanded to the extent that now the console holder is used to store the display screen, by which a seat occupant can access information, whether in the form of a television program or movie, or in the form of computer displays.

Preferably, the adjustment part has a rod-like displacement part which, located on one longitudinal side of the display screen, is guided so as to be able to move in a longitudinal direction within the guide of the console. Furthermore, the adjustment part, preferably in the area of the top end of the display screen, has a first articulation point allowing at least one swiveling motion around the axis of the rod-like displacement part. The display screen thus can be swiveled in the direction of the seat occupant, and the display screen can be adjusted in tilt relative to the seat occupant around another second articulation point.

In another preferred embodiment, the rod-like displacement part has a height adjustment making it possible for the display screen to be fastened outside the console in a definable height range. In this way, the display screen clearly can be adapted to the different body sizes of the seat occupant in terms of its adjustability.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a schematic, not to scale, perspective view of a console with two display screens, one in the extended or use position, one in the rest position, according to an embodiment of the present invention; and FIG. 2 is a schematic, not to scale, exploded perspective view of the articulation situation with respect to the left upper display screen edge of the console shown in FIG. 1.

DETAILED DESCRIPTION OF THE INVENTION

FIG. 1 shows the part of a console 10 facing the viewer, as positioned as a middle console between two adjacent aircraft passenger seats (not shown). This console 10 is assembled preferably in the manner of a shell from metal sheets which border a rectangular holder 12 in the middle. Two display screens 14, 16 can be integrated in this holder 12. The display screen 14 is shown in the extended position as shown in FIG. 1. The display screen 16 is lowered completely into the holder 12 in its rest position. By the adjustment part 18, the respective display screen 14, 16 can be moved out of its rest position in the holder 12 into the position of use. This movement will be described in greater detail below. The respective adjustment part 18 has a rod-like displacement part 20, which, as viewed in FIG. 1, closes to the top in a bar-like extension and is continued toward the bottom as a rod. The pertinent displacement part 20 is positioned on one of the two longitudinal sides 22 of the respective display screen 14, 16. Furthermore, the displacement part 20 is guided so as to be able to move in the longitudinal direction within a guide 24 in the console 10. The guide 24 of the console 10 consists essentially of a guide channel 26 designed in the manner of a perforated metal plate. On the one hand, the guide channel closes the console 10 to the front in the direction of the front edge of the seat part (not shown). Two lateral boundary surfaces 28 of the guide channel 26 overlap the edge-side areas of the rod-like displacement part, to the extent directly assigned.

The indicated adjustment part 18 in the area of the top end of the display screen 14, 16 has a first articulation point or joint 30 which allows at least one swiveling motion around the vertical axis of the rod-like displacement part 20. The pertinent first articulation point 30, as shown in FIG. 2, is formed by three pivoting bearings, which, held in a housing 32, permit the indicated swiveling motion. As viewed in FIG. 1, the display screen 14 in its raised position can be swiveled out of the illustrated position counterclockwise into a transverse position of use, in which the display screen 14 as part of the monitor housing extends parallel to the front boundary sheet of the guide channel 26 and accordingly transversely to the other display screen 16 in its rest position shown in FIG. 1.

Adjacent to the first articulation point 30, another second articulation point or joint 34 is integrated in the upper frame part of the display screen 14, and permits further swiveling motion of the display screen 14 around an axis 36 transverse to the vertical axis of the rod-like displacement part 20. The respective articulation point 30, 34 has a stop boundary which is not detailed and which limits the possible swiveling motion of the respective display screen 14, 16 to facilitate obvious use. Moreover, the rod-like displacement part 20 in conjunction with the outside housing of the adjustment part 18 has a vertical adjustment (not shown), permitting the display screen 14, 16 to be fastened outside the console 10 in a definable range of heights. A raised display screen 14, 16 in the position of use can thus be adjusted in height to enable use by individuals of varied body size.

Each display screen 14, 16 is moreover provided with a supply cable 38 which is used for example to supply electric current. The cable can also be used as an information-transmitting cable, and is guided flexibly within the console holder 12 such that it can follow the respective extension/retraction motion of the display screen 14, 16. As FIG. 2 furthermore shows, two display screens 14, 16 can be accommodated in the console 10, in the rest position within the console 10 with the two display screens 14, 16 facing one another. This arrangement helps prevent damage to the sensitive surface. For an embodiment, which is not detailed, it is also possible to use the back of the display screen 14, 16 as a working surface, for example as a table surface.

The present invention ensures that the display screen 14, 16 and/or the monitor is installed suspended on a support arm, formed from an adjustment part 18, the indicated articulation points 30, 34, and the top frame part of the respective display screen 14, 16. With this solution, it is possible for the first time to use 15 inch monitors as display screens 14, 16 on aircraft passenger seats in particular. By the indicated articulation points 30, 34, the mobility of the display screen 14, 16 is divided into two independently articulated degrees of freedom. The support arm is used at the same time as a cable guide and optionally for the necessary ventilation as the display screens 14, 16 generate heat. The principle of the present invention, that is, the principle of a vertical pipe which is vertically and linearly guided, implements the relevant guidance by only one guideway which is used moreover as a structurally integrated component of the stiffening of the center console 10. A corresponding secondary guide on the side opposite the vertical pipe ensures efficient and precise positioning of the monitors in the VDU. This solution uses a minimum of components to reduce weight and cuts production costs.

To the extent the application documents address a display screen 14, 16, fundamentally a display screen-monitor enclosed by a display screen frame part is implied. The indicated adjustment parts for the display screens 14, 16 can also be extended in one development in a telescoping manner. Triggering the extension/retraction movements would be possible by an exterior drive (not shown).

While one embodiment has been chosen to illustrate the invention, it will be understood by those skilled in the art that various changes and modifications can be made therein without departing from the scope of the invention as defined in the appended claims.

What is claimed is:

1. A console for delimiting a seat part of a vehicle seat and forming an armrest for the vehicle seat, comprising:
    a holder having a guide;
    a first display screen movable between a rest position in said holder and a use position outside said holder and visible to a seat occupant; and
    an adjustment part coupled to said holder and said display screen for moving and guiding said display screen between said rest and use positions, said adjustment part having first and second articulation joints and having a rod-shaped displacement part received within and axially displaceable along a longitudinal axis thereof within said guide, said displacement part being located on a longitudinal side of said display screen, said first articulation joint being adjacent an upper end of said display screen to allow rotation about a longitudinal axis of said displacement part, said second articulation joint being located on an upper edge of said display screen and adjacent said first articulation joint to allow rotation of said display screen about a transverse axis perpendicular to said longitudinal axis of said displacement part.

2. A console according to claim 1 wherein
said guide consists essentially of a guide channel closing said holder along a front edge thereof and having side boundary surfaces that overlap areas of said displacement part.

3. A console according to claim 1 wherein
said articulation joints have stop boundaries limiting rotation of said display screen to predetermined angular movements.

4. A console according to claim 1 wherein
said displacement part includes a height adjustment enabling fastening of said display screen within a predetermined height range outside said holder.

5. A console according to claim 1 wherein
a flexible supply cable inside said holder follows extension and retraction movements of said display screen.

6. A console according to claim 1 wherein
a second display screen is movably mounted in said holder between a rest position in said holder and a use position outside said holder and visible to a seat occupant, said first and second display screens facing each other in said rest position thereof.

7. A console according to claim 1 wherein
a back of said display screen forms a working table surface.

8. A console according to claim 1 wherein
said holder has an opening in a top surface thereof through which said display screen passes in moving between said use and rest positions.

9. A console according to claim 1 wherein
said displacement part extends along a said longitudinal side of said display screen.

* * * * *